United States Patent Office 3,337,406
Patented Aug. 22, 1967

3,337,406
TREATMENT OF ARTERIOSCLEROTIC DISEASES
Peter T. De Marco, Pine Hill, N.J., and Louis J. Salerno, Philadelphia, Pa., assignors to Mar-Sal, Inc., Philadelphia, Pa., a corporation of Pennsylvania
No Drawing. Filed Dec. 12, 1963, Ser. No. 329,943
5 Claims. (Cl. 167—65)

ABSTRACT OF THE DISCLOSURE

Arteriosclerotic, atherosclerotic and related metabolic diseases are treated by intramuscular injections of aqueous compositions containing an organic local anesthetic compound and an agent for inhibiting hydrolysis of the compound after injection. The anesthetic compound is selected from the group consisting of procaine hydrochloride, butacaine sulfate, tetracaine hydrochloride, dibucaine hydrochloride, piperocaine hydrochloride, hexylcaine, phenocaine hydrochloride, lidaocaine, ethylaminobenzoate, butylaminobenzoate, heptacaine, nupercaine, chloroprocaine, procaine borate, and 4 propoxybenzoate hydrochloride. The hydrolysis inhibitor is selected from the group consisting of polyvinylpyrolidone, methyl cellulose, dextran, gelatin and polyoxyethylene sorbitan mono-oleate.

This invention relates to compositions and treatment of arteriosclerotic and atherosclerotic disease processes.

More specifically, this invention relates to compositions adapted for intramuscular injections in living tissues of humans and animals in the treatment of arteriosclerosis and atherosclerosis and various diseases accompanying the physiological aging process which can be retarded or helped by beneficiating the arterial system and all its subdivisions.

Arteriosclerosis and atherosclerosis are the most insidious and prevalent causes of death in America today. Many etiological factors have been advanced such as:

(A) Neurogenic factors.

Under this heading are the stresses, strains, competitive drives and the unending pressures present in our society.

(B) Dietary factors.

Those people having a high intake of animal products show a higher rate of atherosclerosis as opposed to those people having a low intake of animal products having a low rate of atherosclerosis.

(C) The elevation of cholesterol in the blood.

Much work has been done on humans and animals to show that elevated cholesterol levels in the blood tend to coincide with the high incidence of coronary atherosclerosis. In animals fed large doses of cholesterol, there is an increased tendency to the production of coronary atherosclerosis.

(D) Blood levels of cholesterol versus blood levels of phospholipids.

Phospholipids act as emulsifiers and may experimentally prevent atherosclerosis.

(E) Atheromas.

Analysis of the atheromas in the blood vessels and analysis of the blood itself indicates that these plaques are of the same composition.

(F) Direct injury to the arterial wall.

This may occur via hypertension, toxicity, mechanical factors resulting from hemodynamic forces which are constantly at play in the arterial system, and smoking.

(G) Heredity and constitution.

There seems to be evidence that the trait of arteriosclerosis and atherosclerosis may be inherited and if not inherited directly then a constitutional weakness of that part of the boy predisposing it to the ravages of arteriosclerosis and atherosclerosis accompanied with or without hypertension.

(H) Endocrine factors.

Coronary sclerosis with resulting myocardial infraction is common in men before forty, but not so in women. This has been linked to the male hormone. The thyroid gland has also been implicated in that a deficiency promotes the atherosclerotic state.

(I) Aging.

Degenerative changes caused by "natural aging" and accelerated aging secondary to diabetes and extreme cases of hypertension. No one theory can adequately explain nor indeed has any specific explanation been found to be acceptable for the etiology of arteriosclerosis and atherosclerosis. Most agree that it is probably a combination of factors with no one factor being singled out as the culprit.

It has been shown that atherosclerotic plaques may be present in the aortas of young men in their twenties, apparently not caused by the aging process, but reason for its presence unexplained. These are not detectable clinically (revealed only at autopsy) and causing no clinical ill effects, but certainly a distinct warning of the possibility of trouble to follow.

The insidiousness of the disease being apparent, it is no wonder that so many men in their prime die suddenly with no forewarning. In those people spared a sudden death, but nevertheless being subject to the disease, one finds readily detectable clinical findings of arterial insufficiency such as: angina pectoris, shortness of breath, tiredness, loss of weight, intermittent claudication, nocturnal leg cramps, poor appetite, failing vision, coldness and numbness of the extremities, poor memory, syncope, loss of muscle tone and power, and decrease or absent libido. These and more clinical findings are confirmed at autopsy as being caused by arterial insufficiency; with newer radiographic techniques these lesions of arterial insufficiency may be demonstrated at times; by the use of direct biopsy these occlusive processes may be demonstrated microscopically. It has been proven that the disease is chronic, certainly progressive and not static, and that as these organs and extremities become more blood starved, death of the part involved is inevitable. If a vital organ such as the heart or the brain is thusly seriously damaged, the person dies while the rest of his body may or may not be ready for "complete death."

Attempts at therapy have taken many forms, these include:

A. Surgery.

(1) Reaming of the diseased arteries to allow blood to flow again.

(2) Implantation of healthy arteries into the diseased organ.

(3) Arterial grafts either of live or synthetic substances.

B. Diet.

(1) Regulation of the intake of animal products.

(2) Reduction of obesity.

(3) Strict control of diabetes.

C. Environment.

(1) Lessening of tension with more time for relaxation.

(2) Moderate exercise.

(3) Regular meals and sleep.

D. Drugs.

(1) Cholesterol lowering agents.

Some tried, proved disastrous, others ineffectual to date.

(2) Vasodilators.

While the vessels have viability and patency, patients do experience relief, but they too shortly become ineffectual as the disease process per se is not halted.
(3) Antihypertensive-agents.
These have been effective in the task for which they are designed, however, no effect once again on the basic disease process. There are occasionally troublesome side effects noted.
(4) Hypoglycemic agents.
These control the diabetic state and retard the aging process of the vessels secondarily.

Some of the above named procedures carry either an undue risk or may produce side effects not desirable or in extreme cases are of no value at all.

None is specific and none has been able to retard the arteriosclerosis and atherosclerosis process, none has been able to engender re-patency in non-patent vessels in which there is occlusive luminal disease. None has been able to engender elasticity of the medial wall of arteriosclerotic vessels. Therapy has included any or all of the above measures deemed sufficient to ameliorate the arteriosclerosis and atherosclerosis states with resulting symptoms.

It has been previously proposed ot administer procaine alone for the treatment of arteriosclerosis and related diseases. However, the clinal results have not been positive and certain in the effects obtained. Apparently, the procaine is rapidly hydrolyzed by the esterases present in the human body and is thus rendered ineffective rapidly. According to our invention, we have discovered that by using a solution of procaine and polyvinylpyrrolidone or equivalent agent, the procaine-polyvinylpyrrolidone solution gives positive and long acting effects for combating arteriosclerosis and atherosclerosis and related diseases.

The following procedure is used in preparing our preferred procaine hydrochloride-polyvinylpyrrolidone therapeutic composition. An aqueous solution is first made by mixing the following components by weight:

SOLUTION A

|  | Percent |
|---|---|
| Procaine hydrochloride | 5.0 |
| Sodium bisulfite | 0.2 |
| Sodium chloride | 2.24 |
| Chlorobutanol | 0.5 |
| Water | 92.06 |
|  | 100.00 |

SOLUTION B

A mixture is made in proportion of 25 gms. of polyvinylpyrrolidone of average mol weight about 40,000 is added to 20 cc. water. The mixture is agitated under vacuum and allowed to stand until a clear solution is obtained. We may use polyvinylpyrrolidone of mol weight ranging from 10,000 to 100,000 and preferably a range of 30,000 to 50,000 mol weight.

*Example I*

To every 95 cc. of Solution A 25 gms. of Solution B is added to produce the following therapeutic composition:

| Procaine hydrochloride | grams | 4.75 |
|---|---|---|
| Polyvinylpyrrolidone | do | 13.89 |
| Sodium bisulfite | percent | 0.2 |
| Sodium chloride | do | 0.24 |
| Chlorobutanol | do | 0.5 |
| Water | grams | 120 |

This composition has a pH of 4.2. The chlorobutanol acts as a preservative and may be replaced by other preservatives, such as phenol, benzyl alcohol, etc. The final solution is placed in vials or ampules and is sterilized in a known manner. The composition is stable at extremes of temperature. Freezing and sterilizing have no effect on its therapeutic effectiveness. It is also stable for long periods of time.

We have found that humans can tolerate intramuscular injections of 20 cc. or the equivalent of 750 mgs. to 1,000 mgs. of the base, but higher dosages may be used safely. The only side effect we have found is one of transient dizziness for thirty to sixty minutes. This sensation passes off rapidly with no harmful side effects. We have found no evidence of toxicity to the liver, kidneys, bone marrow, etc. As a matter of fact, these organs are helped as evidenced by the patients' sense of well being, weight gain, better appetite, etc. We have found no instance of refractoriness or allergy. We have found that our procaine-polyvinylpyrrolidone solution has unexpected and unobvious properties of great value in the specific therapy of arteriosclerosis and atherosclerosis with all its resulting complications.

It appears that the locus of action of our composition is in the entire vascular system and it produces the following effects: re-establishes patency in previously occluded atherosclerosis vessels; establishes elasticity of vessels in which medial calcication has occurred due to arteriosclerosis; procaine per se has never been recognized as a vasodilator, however, when used in solution with polyvinylpyrrolidone, procaine-polyvinylpyrrolidone becomes a potent, long-acting vasodilator; studies show that the procaine-polyvinylpyrrolidone solution has relatively no therapeutic value as an anesthetic. In short, the entire vascular system is revitalized, with concomitant revitalization of the affected organ or limb.

For preventive therapy we inject intramuscularly 10 to 15 cc. of our preferred composition once every 7 or 15 days. In cases of mild or moderate arteriosclerosis and atherosclerosis we administer 10 to 15 cc. of our preferred composition every 7 days; 10 to 20 cc's. every 7 days for moderately severe cases; in severe cases, 15 to 20 ccs. three times a week for a period of 2 to 3 weeks and then 15 to 20 ccs. once or twice weekly. Such individual injections may contain from about 0.25 to about 1 gm. of procaine hydrochloride and about 0.75 to about 3 gm. polyvinylpyrrolidone mol weight 30,000 to 50,000. These injections are therapeutically effective in the treatment of human arteriosclerotic and atherosclerotic disease processes and various diseases accompanying the human aging process which are retarded or ameliorated by the vasodilatory action on the arterial system and all its subdivisions so that the apparent metabolic imbalance existing in such diseases is remedied.

The following are illustrative diseases amenable to treatment according to our invention:

(1) Given coronary artery disease with or without a previous history of myocardial infarction and with activities being the same before therapy with procaine-polyvinylpyrrolidone soultion as during therapy, the following results were obtained with procaine-polyvinylpyrrolidone complex alone: (a) absence of angina after a maximal time of thearpy of two to ten days with increasing tolerance to activities as therapy is continued; (b) elimination of shortness of breath; (c) increased appetite; (d) diminution to absence of previously refractory edema; (e) elimination of tiredness with return of ambition; and (f) return of a sense of well being.

(2) Given myocardial insufficiency with congestive heart failure and with activities being equal before and after therapy the following results were obtained after two to ten days therapy with procaine-polyvinylpyrrolidone solution: (a) elimination of shortness of breath; (b) increased diuresis; (c) diminution to absence of previously refractory edema; (d) elimination of tiredness with return of ambition; (e) return of a sense of well being; and (f) diminution of heart size.

In those cases taking digitalis or diuretics in any form approximately 50% no longer need either one and clinically do much better than previously. There are those extreme cases where digitalis or diuretics cannot be eliminated, in which case the need for diuretics is reduced by one-half to two-thirds of the previously needed dosage.

(3) Given abnormal rhythms of the heart of approximately six months to one year duration or an abnormal rhythm of the heart of acute onset due to cardiac strain or acute infection, the following occurs with procaine-polyvinylpyrrolidone solution: return to normal sinus rhythm after two to ten days of therapy with procaine-polyvinylpyroolidone complex.

(4) Given a case critically ill with heart disease secondary to arteriosclerosis and atherosclerosis and being treated with standard forms of therapy such case not given long to live and such case being placed on procaine-polyvinylpyrrolidone solution therapy and with recovery being very much evidenced while on therapy withdrawal of the drug can mean death of the patient in less than one week.

(5) Given a case of acute myocardialinfarction the following will occur with procaine-polyvinylpyrrolidone solution: (a) no oxygen therapy necessary after one or two hours if at all; (b) absence of pain after three to four hours; (c) no bed rest necessary; (d) no special diet necessary; (e) no analgesics or sedatives necessary; (f) rapid return to normal electro cardiograph; (g) no apprehension is evident after one to two hours; and (h) return to normalcy much faster than using standard therapeutic measures.

(6) Given a case of stasis ulcer of the leg of eight to twelve years duration with frequent break downs and with classic surrounding pigmentation and classic fibrosis the following occurs with procaine-polyvinylpyrrolidone solution: (a) complete healing of the ulcer in one to four months; (b) gradual disappearance of up to seventy-five per cent of the area of pigmentation; (c) disappearance of fibrosis; (d) softness and pliability of skin returns; (e) absence of edema after one to three days; (f) no curtailment of physical activities; (g) disappearance of pain after one to three days; and (h) if secondarily infected, no antibiotics are necessary to assist healing.

(7) Given an extremity that has advanced atherosclerosis and arteriosclerosis with gangrene being imminent and amputation the only measure remaining for survival of the patient, the following occurs with procaine-polyvinylpyrrolidone solution: (a) beginning gangrene disappears within 24 hours; (b) disappearance of the rubor; (c) disappearance of pain; (d) restoration of peripheral pulses to normalcy; and (e) warmth and feeling return to normalcy.

(8) Given a case of acute vascular occlusion of a vessel initiation of therapy while the limb retains a measure of viability restores the limb to normalcy in seven to fifteen days.

(9) Given a case of intermittent claudication and nocturnal leg cramps, the following occurs with procaine-polyvinylpyrrolidone solution: (a) complete absence of intermittent claudication; and (b) complete absence of nocturnal leg cramps.

(10) Given a case of rental insufficiency, the following occurs with procaine-polyvinylpyrrolidone solution: (a) fall of blood urea nitrogen; (b) increased diuresis with no loss of potassium; (c) diminished to absent toxicity; and (e) diminution to absence of edema.

(11) Given a case of hepatic damage, the following will occur with treatment with procaine-polyvinylpyrrolidone solution: (a) return of liver functions studies to normal; (b) return of appetite; (c) return of sense of well being; (d) absence of jaundice; and (e) absence of ascites.

(12) Given a case of cerebral ischemia, the following occurs with procaine-polyvinylpyrrolidone solution: (a) disappearance of grand mal seizures if present; (b) return of bowel and urinary function; (c) return to some form of normalcy of speech, locomotion, recognition, sight, comprehension, rationality, and (d) disappearance of syncope.

(13) Given a case of brittle diabetes, the following occurs with procaine-polyvinylpyrrolidone solution: (a) fall of blood sugar to normal with no increase of whatever hypoglycemic agent is used or regimentation of diet; (b) reversal of ocular pathology.

(14) Given a case of collagen disease such as rheumatoid arthritis the following occurs with procaine-polyvinylpyrrolidone solution: (a) disappearance of pain; (b) diminution to absence of edema; (c) reduction of joint size; (d) greater articulating freedom; (e) better locomotion and ambulation; and (f) prevention of ankylosis.

The previous specific examples given of our invention relate to the administration of procaine hydrochloride-polyvinylpyrrolidone solution. However, in place of procaine hydrochloride, we may also use other esters of aminobenzoic acid and tertiary amino esters of aromatic acids and their salts which have the property of producing local anesthesia. Also in place of polyvinylpyrrolidone we may use other polymeric agents, such as methyl cellulose, dextran, gelatin, polysorb (polyoxyethylene sorbitan mono-oleate) and derivatives thereof. We may use the following compounds which have the property of producing local anesthesia and associate them with a suitable polymeric complexing agent for inhibiting hydrolysis when injected into living tissues: butacaine sulfate, tetracaine hydrochloride, dibucaine hydrochloride, piperocaine hydrochloride, hexylcaine, phenocaine hydrochloride, lidocaine, ethylaminobenzoate, butylaminobenzoate, heptacaine, nupercaine, chloroprocaine, procaine borate, 4 propoxybenzoate hydrochloride. The pH of our compositions may be suitably adjusted to have a pH of 4 to 7. The following are typical additional examples of our therapeutic compositions:

*Example II*

| | Grams |
|---|---|
| Xylocaine | 1 |
| Methyl cellulose | 3 |
| Water | 20 |

*Example III*

| | |
|---|---|
| Tetracaine hydrochloride | 1 |
| Methyl cellulose | 3 |
| Water | 20 |

*Example IV*

| | |
|---|---|
| Holocain hydrochloride | 1 |
| Methyl cellulose | 3 |
| Water | 20 |

The methyl cellulose used in the above examples is NF Methocel sold by Dow Chemical Company and has a viscosity of 7,000.

*Example V*

| | |
|---|---|
| Phenocain hydrochloride | 1 |
| Gelatin | 3 |
| Water | 20 |

Intramuscular injections of our compositions in humans produce the following physiological results:

The arteries and veins and their complete sub-divisions are dilated, and the atheromatous debris is cleared from the intimal wall. The vessels return to patency and elasticity, and in the process, the vascular bed is revitalized. Peripheral pulsations, which could not be elicited previously, return to palpability, indicating the flowing of blood through previously closed vessels. The composition dissolves the atheromatous debris and the atheromatous-like substances, which are present in the blood stream and blood vessels. Apparently, by virtue of miscibility, it promotes a cleansing and reaming action of the vascular system. The coronary arteries are dilated, thus eliminating angina pectoris. The renal arterial system experiences an increased blood flow. In like fashion all organs experience similar action. It follows, therefore, that all organs including heart, kidney, brain, etc., experience an increased blood flow with a concomitant revitalization.

Our composition will produce diuresis and diaphoresis with no overt or covert signs of kidney or heart pathology. In instances of edema refractory to the mercurials and thiazide derivatives, it will produce diuresis and diaphoresis in edema associated with pathology. It will cause diuresis and diaphoresis with no overt or covert sign of pathology being present. It produces a diuresis with no loss of potassium with no refractorness being noted. In instances of edema refractory to the mercurials and thiazide, derivatives, our composition will produce diuresis.

Our composition increases cardiac competence to such a degree as to eliminate wholly the need for digitalis in most instances. In those instances where signs of severe cardiac decompetence are present, our composition may be used in conjunction with digitalis. The combined effect of both, on cardiac competence, is greater than if digitalis were used alone. In certain instances our composition will stop atrial fibrillation and return the rhythm to normal. In contrast to quinidine, our composition may be used with digitalis. It can be employed with bacterial infection and can be given to far advanced cardiac incompetence. It will slow the pulse rate more effectively than digitalis. It does not produce central stimulation.

We claim:

1. The method of treating arteriosclerotic, atherosclerotic and related metabolic diseases which comprises injecting into living animal muscular tissues a sterile aqueous composition comprising essentially 0.025 to 1 gm. of a procaine salt and 0.75 to 3 gm. of polyvinylpyrrolidone having a mol weight from 30,000 to 50,000.

2. The method of treating arteriosclerotic, atherosclerotic and related metabolic diseases which comprises injecting into living animal muscular tissues a sterile aqueous composition comprising essentially an organic local anesthetic compound selected from the group consisting of procaine hydrochloride, butacaine sulfate, tetracaine hydrochloride, dibucaine hydrochloride, piperocaine hydrochloride, hexylcaine, phenocaine hydrochloride, lidaocaine, ethylaminobenzoate, butylaminobenzoate, heptacaine, nupercaine, chloroprocaine, procaine borate, and 4 propoxybenzoate hydrochloride, and an agent selected from the group consisting of polyvinylpyrrolidone, methyl cellulose, dextran, gelatin and polyoxyethylene sorbitan mono-oleate for inhibiting hydrolysis of said compound when injected into living animal muscular tissues.

3. The method of treating arteriosclerotic, atherosclerotic and related metabolic diseases which comprises injecting into living animal muscular tissues a sterile aqueous composition comprising essentially a salt of procaine and polyvinylpyrrolidone for inhibiting hydrolysis of the procaine salt when injected into living animal muscular tissues.

4. The method of treating arteriosclerotic, atherosclerotic and related metabolic diseases which comprises injecting into living animal muscular tissues a sterile aqueous composition comprising essentially procaine hydrochloride and a polymeric substance for inhibiting hydrolysis of the procaine hydrochloride when injected into living animal muscular tissues, said polymeric substance being selected from the group consisting of polyvinylpyrrolidone, methyl cellulose, dextran, gelatin, and polysorb.

5. The method of treating arteriosclerotic, atherosclerotic and related metabolic diseases which comprises injecting into living animal muscular tissues a sterile aqueous composition comprising essentially procaine hydrochloride and polyvinylpyrrolidone having a mol weight from 10,000 to 100,000.

References Cited
UNITED STATES PATENTS 3,172,805  3/1965  De Salva et al. _____ 167—65

OTHER REFERENCES

Graham et al., Journal of Pharmacy and Pharmacology, vol. 6, No. 1, pages 27–31 (copy in Group 1).

Guignot, Current Hist. of Medical Literature, Cumulated Author and Subject Indexes, vol. 34, pages S–486, col. 3, No. 53809, abstracting Bulletin des Societes D'Ophtalmologie de France (Paris), No. 2, pages 152–155 (February 1958).

Lach, Chemical Abstracts, vol. 54, col. 5008(d) 1960.

Lesser Drug and Cosmetic Industry, Vol. 75, No. 1, pages 32–37.

Nebo Cumulated Index Medicines, vol. 4, part III (Subject Index K–Z), page S–2468, top of col. 2, abstracting Hospital (Rio), vol. 63, pages 567–571 (March 1963).

New Product Bulletin No. P–100 (Plasdone-PVP), General Aniline and Film Corporation, pages 17–18, June 15, 1951.

ALBERT T. MEYERS, *Primary Examiner.*

SAM ROSEN, *Examiner.*

LEROY B. RANDALL, *Assistant Examiner.*